US012164097B2

United States Patent
Kolle et al.

(10) Patent No.: US 12,164,097 B2
(45) Date of Patent: Dec. 10, 2024

(54) BRAGG LIGHT SOURCE FOR DARK-FIELD IMAGING DEVICES

(71) Applicant: Massachusetts Institute of Technology, Cambridge, MA (US)

(72) Inventors: Mathias Kolle, Hull, MA (US); Cecile Chazot, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 466 days.

(21) Appl. No.: 17/133,159

(22) Filed: Dec. 23, 2020

(65) Prior Publication Data

US 2021/0302710 A1 Sep. 30, 2021

Related U.S. Application Data

(60) Provisional application No. 62/980,504, filed on Feb. 24, 2020.

(51) Int. Cl.
*G02B 21/10* (2006.01)
*G02B 5/08* (2006.01)
*G02B 17/06* (2006.01)
*G02B 5/09* (2006.01)

(52) U.S. Cl.
CPC ............... *G02B 21/10* (2013.01); *G02B 5/08* (2013.01); *G02B 17/0673* (2013.01); *G02B 5/0825* (2013.01); *G02B 5/09* (2013.01)

(58) Field of Classification Search
CPC . G02B 21/10; G02B 5/09; G02B 5/08; G02B 5/0825; G02B 5/0816; G02B 5/288; G02B 5/26; G02B 17/0673; G02B 19/0066; G02B 5/1861
See application file for complete search history.

(56) References Cited

U.S. PATENT DOCUMENTS

| | | | | |
|---|---|---|---|---|
| 3,620,606 A | * | 11/1971 | Tschunko | G02B 5/08 359/849 |
| 5,925,433 A | * | 7/1999 | Dubbeldam | G11B 7/24 |
| 6,366,017 B1 | | 4/2002 | Antoniadis et al. | |
| 7,006,294 B2 | * | 2/2006 | Steenblik | G02B 3/0012 380/54 |
| 7,271,889 B2 | * | 9/2007 | Cemic | G01N 21/8806 356/237.2 |
| 7,346,251 B2 | * | 3/2008 | Bose | B82Y 20/00 359/332 |

(Continued)

FOREIGN PATENT DOCUMENTS

| | | | |
|---|---|---|---|
| CN | 110425491 A | * 11/2019 | |
| GB | 2374201 A | * 10/2002 | ............. H01S 5/141 |

(Continued)

OTHER PUBLICATIONS

Maria Ujué González et al., Analysis of the Angular Acceptance of Surface Plasmon Brag Mirrors, 32 Optics Letters 2704-2706 (2007). (Year: 2007).*

(Continued)

*Primary Examiner* — Cara E Rakowski
*Assistant Examiner* — Wesley Scott Ashton
(74) *Attorney, Agent, or Firm* — Wolf, Greenfield & Sacks, P.C.

(57) ABSTRACT

Articles and systems for dark microscopy and related methods are generally described.

13 Claims, 12 Drawing Sheets

(56) References Cited

U.S. PATENT DOCUMENTS

| | | | |
|---|---|---|---|
| 8,119,960 B2* | 2/2012 | Fukuyama | G02B 21/002 |
| | | | 250/201.3 |
| 8,610,092 B2* | 12/2013 | Rue | H01J 37/226 |
| | | | 250/492.3 |
| 8,854,662 B1* | 10/2014 | Aguiling | G06F 3/1282 |
| | | | 358/1.15 |
| 9,297,991 B2* | 3/2016 | Takahashi | G02B 21/26 |
| 10,073,191 B2* | 9/2018 | Shen | G02B 5/3066 |
| 10,348,058 B1* | 7/2019 | Gwo, Jr. | H01S 5/2031 |
| 11,506,535 B1* | 11/2022 | Tu | G01J 3/1809 |
| 11,680,900 B2* | 6/2023 | Groves | G01N 21/51 |
| | | | 702/32 |
| 11,921,277 B2* | 3/2024 | Takimoto | G02B 21/24 |
| 11,977,211 B2* | 5/2024 | Fisch | G02B 21/0016 |
| 2005/0237605 A1* | 10/2005 | Vodyanoy | G02B 21/16 |
| | | | 359/368 |
| 2010/0265552 A1* | 10/2010 | Wang | G02F 1/29 |
| | | | 359/9 |
| 2010/0283072 A1* | 11/2010 | Kazlas | G02B 6/005 |
| | | | 257/89 |
| 2011/0092762 A1* | 4/2011 | Wong | A61B 17/435 |
| | | | 435/6.1 |
| 2011/0135188 A1* | 6/2011 | Chang | G01N 21/9505 |
| | | | 382/149 |
| 2013/0335976 A1* | 12/2013 | Ben-Ezer | G02B 21/10 |
| | | | 362/311.12 |
| 2015/0338345 A1* | 11/2015 | Lakowicz | G02B 6/00 |
| | | | 435/7.1 |
| 2016/0041323 A1* | 2/2016 | Ma | G03H 1/0408 |
| | | | 355/2 |
| 2016/0097885 A1* | 4/2016 | Comstock, II | C23C 14/35 |
| | | | 359/359 |
| 2017/0138849 A1* | 5/2017 | Tucker-Schwartz | G01N 21/49 |
| 2017/0371090 A1* | 12/2017 | Fattal | H04N 13/302 |
| 2019/0285547 A1* | 9/2019 | Giacomotti | G01Q 60/22 |
| 2021/0020798 A1* | 1/2021 | Cardwell | H01L 31/022408 |
| 2021/0181391 A1* | 6/2021 | Subramaniyam | G01N 21/774 |
| 2022/0019022 A1* | 1/2022 | Hashiya | G01S 7/4817 |
| 2022/0247908 A1* | 8/2022 | Wang | H04N 13/161 |

FOREIGN PATENT DOCUMENTS

| | | | |
|---|---|---|---|
| WO | WO-2011100065 A2 * | 8/2011 | A61B 3/0008 |
| WO | WO-2012006558 A2 * | 1/2012 | G01J 3/0208 |
| WO | WO-2018005088 A1 * | 1/2018 | C08K 9/04 |
| WO | WO-2018189274 A1 * | 10/2018 | G01J 3/44 |
| WO | WO-2019086770 A1 * | 5/2019 | G01N 21/255 |

OTHER PUBLICATIONS

Jonathan A. Fan, Near-Normal Incidence Dark-Field Microscopy: Applications to Nanoplamonic Spectroscopy, 12 Nano. Lett. 2817-2821 (2012), (Year: 2012).*

Bragg Mirrors—Definition and Applications, 2014, one page [online], [retrieved Feb. 6, 2023], retrieved from Internet <URL: https://www.azooptics.com/Article.aspx?ArticleID=857>. (Year: 2014).*

Reflection of Light, 2015, pp. 1-8 [online], [retrieved Feb. 7, 2023], retrieved from the Internet <URL: https://micro.magnet.fsu.edu/primer/lightandcolor/reflectionintro.html >. (Year: 2015).*

Nathan D. Klein et al., Dark Field Transmission Electron Microscopy as a Tool for Identifying Inorganic Nanoparticles in Biological Matrices, 87 Anal. Chem. 4356-4362 (2015). (Year: 2015).*

Suresh D. Pillai, Introduction to Electron-Beam Food Irradiation, 2016, pp. 1-12 [online], [retrieved Feb. 8, 2023], retrieved from the Internet <URL: https://www.aiche.org/resources/publications/cep/2016/november/introduction-electron-beam-food-irradiation >. (Year: 2016).*

Learn About LED Bulbs, 2017, pp. 1-4 [online], [retrieved Feb. 9, 2023], retrieved from the Internet <URL: https://www.energystar.gov/products/lighting_fans/light_bulbs/learn_about_led_bulbs >. (Year: 2017).*

Jeannine Volchko, Visible Light Spectrum: From a Lighting Manufacturer's Perspective, 2018, pp. 1-14 [online], [retrieved Feb. 8, 2023], retrieved from Internet <URL: https://www.lumitex.com/blog/visible-light-spectrum#:~:text=Visible%20light%20is%20usually%20defined,one%20billionth%20of%20a%20meter.>. (Year: 2018).*

U.S. Appl. No. 62/897,553, filed 2019.*

Bragg Mirror (Reflector) Features and Technologies, 2016, pp. 1-2 [online], [retrieved Aug. 14, 2023], retrieved from the Internet <URL: https://fibergratings.com/bragg-mirror-reflector-features-and-technologies/>. (Year: 2016).*

Solid-state Lighting Technology Fact Sheet, 2016, pp. 1-6 [online], [retrieved Aug. 14, 2023], retrieved from the Internet <URL: https://www.energy.gov/sites/prod/files/2016/08/f33/led-color-characteristics-factsheet.pdf>. (Year: 2016).*

Mortimer Abramowitz, Darkfield Illumination, 2018, pp. 1-10 [online], [retrieved Aug. 14, 2023], retrieved from the Internet <URL: https://micro.magnet.fsu.edu/primer/techniques/darkfield.html>. (Year: 2018).*

Jennifer Chu, Mirrored Chip Could Enable Handheld Dark-field Microscopes, 2020, pp. 1-6 [online], [retrieved Aug. 13, 2023], retrieved from the Internet <URL: https://physicsworld.com/a/dark-field-microscopes-made-easy/>. (Year: 2020).*

Andy Watson et al., Lighting Up Cells with Quantum Dots, 34 Biotechniques 296-303 (2003). (Year: 2003).*

Masami Ando et al., Dark-Field Imaging: Recent Developments and Potential Clinical Applications, 32 Physica Medica 1801-1812 (2016). (Year: 2016).*

Yemliha Altintas et al., CdSe/ZnS Quantum Dot Films for High Performance Flexible Lighting and Display Applications, 27 Nanotechnology 295604-1 to 295604-9 (2016). (Year: 2016).*

Dennis M. Mills, X-ray Optical Components for Hard X-ray Synchrotron Radiation Sources, 2017, pp. 1-39 [online], [retrieved Nov. 17, 2023], retrieved from the Internet <URL: https://neutrons.ornl.gov/sites/default/files/Optics%202017_Mills%20-%201.pdf>. (Year: 2017).*

Capuzzo, G. et al. All-nitride AlxGa1-xN: Mn/GaN distributed Bragg reflectors for the near-infrared. Sci. Rep. 7, 42697; doi: 10.1038/srep42697 (2017). (Year: 2017).*

Michael Sztucki et al., Development of a Crystal Collimation System for High-resolution Ultra-small-angle X-ray Scattering Applications, 26 Journal of Synchotron Radiation 439-444 (2019). (Year: 2019).*

Huaibin Shen et al., Visible Quantum Dot Light-emitting Diodes with Simultaneous High Brightness and Efficiency, 13 Nature Photonics 192-197 (2019). (Year: 2019).*

Klaus Heinemann et al., Selected-Zone Dark-Field Electron-Microscopy, 20 Applied Physics Letters 122-125 (1972). (Year: 1972).*

Mikhail A. Kats, Dark Field on a Chip, 14 Nature Photonics 266-267 (2020). (Year: 2020).*

Chazot et al., Luminescent Surfaces with Tailored Angular Emission for Compact Dark-Field Imaging Devices. Nat Photonics. May 2020;14(5):310-315. doi: 10.1038/s41566-020-0593-1. Epub Feb. 24, 2020. PMID: 33584848; PMCID: PMC7877670.

Gage et al., Modern dark-field microscopy and history of its development. Trans Am Microsc Soc. 1920; 39: 95-141.

Höhn et al., Maximal power output by solar cells with angular confinement. Opt Express. May 5, 2014;22 Suppl 3:A715-22. doi: 10.1364/OE.22.00A715. PMID: 24922379.

Lin et al., Improvement of light quality by DBR structure in white LED. Opt Express. Feb. 9, 2015;23(3):A27-33. doi: 10.1364/OE.23.000A27. PMID: 25836249.

Schwarz et al., Photonic Structures in LEDs and Solar Cells. International Conf Solid State Devices Materials. 2015;564-565.

Wiesmann et al., Photonic crystal LEDs—designing light extraction. Laser & Photon Rev. 2009;3:262-286.

Braslavsky et al., Objective-type dark-field illumination for scattering from microbeads. Appl Opt. Nov. 1, 2001;40(31):5650-7.

Gage, Modern dark-field microscopy and the history of its development. Transactions. 1920; 39(2): 95-141.

Ma et al., Precision improvement in dark-field microscopy imaging by using gold nanoparticles as an internal reference: a combined

(56) References Cited

OTHER PUBLICATIONS theoretical and experimental study. Nanoscale. Apr. 28, 2016;8(16):8729-36. doi: 10.1039/c5nr08837b. Epub Apr. 11, 2016.
Noda et al., A new microscope optics for laser dark-field illumination applied to high precision two dimensional measurement of specimen displacement. Rev Sci Instrum. Feb. 2008;79(2 Pt 1):023704.
Olshausen et al., Coherent total internal reflection dark-field microscopy: label-free imaging beyond the diffraction limit. Optics Lett. Oct. 2013; 38(20): 4066-9.
Taylor et al., Enhanced sensitivity in dark-field microscopy by optimizing the illumination angle. Appl Opt. Aug. 10, 2013;52(23):5718-23.
Ueno et al., Simple dark-field microscopy with nanometer spatial precision and microsecond temporal resolution. Biophys J. May 19, 2010;98(9):2014-23.
Wei et al., Organic light-emitting-diode-based plasmonic dark-field microscopy. Opt Lett. Nov. 1, 2012;37(21):4359-61.
Zheng et al., Surface-wave-enabled darkfield aperture for background suppression during weak signal detection. Proc Natl Acad Sci U S A. May 18, 2010;107(20):9043-8. doi: 10.1073/pnas.0912563107. Epub May 3, 2010.
Zheng et al., Microscopy refocusing and dark-field imaging by using a simple LED array. Opt Lett. Oct. 15, 2011;36(20):3987-9.

\* cited by examiner

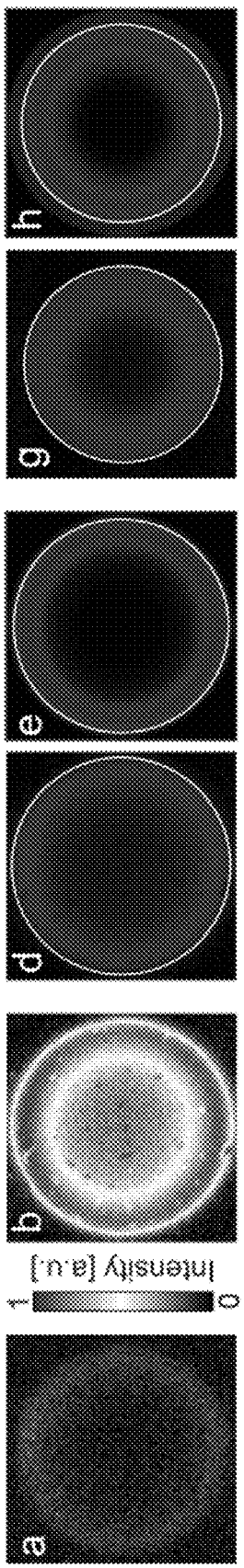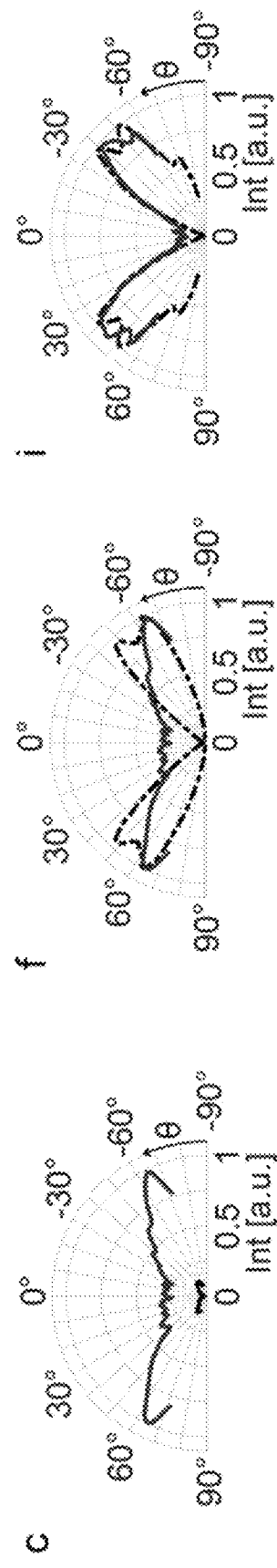
FIG. 4A FIG. 4B FIG. 4D FIG. 4E FIG. 4G FIG. 4H
FIG. 4C FIG. 4F FIG. 4I

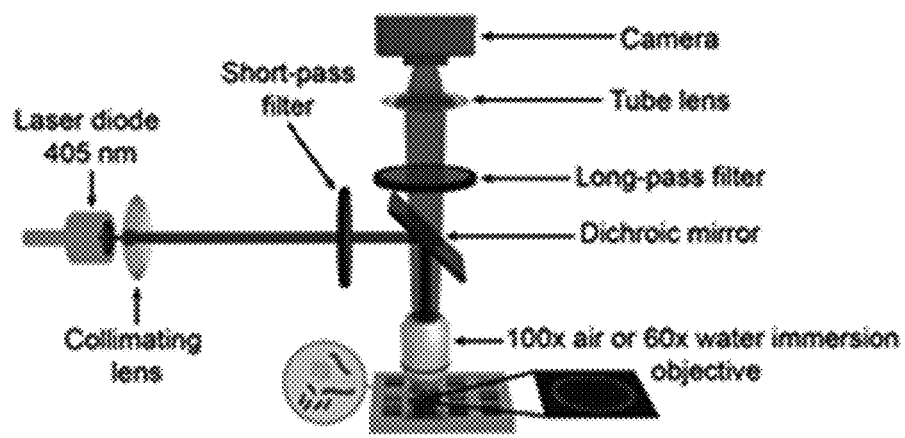
FIG. 5A
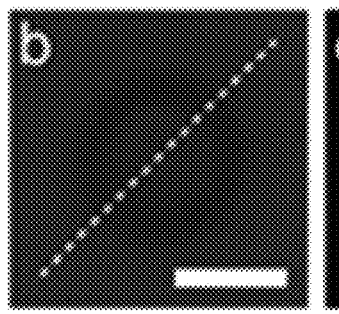 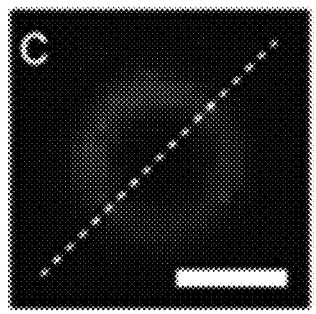 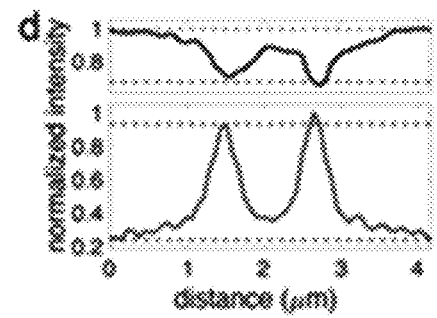
FIG. 5B   FIG. 5C   FIG. 5D
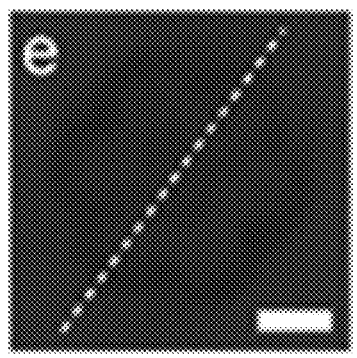 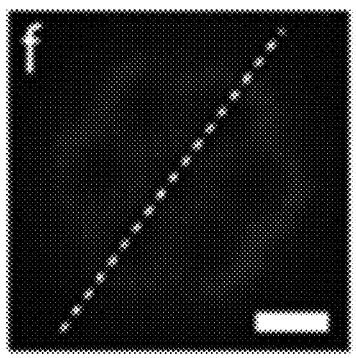 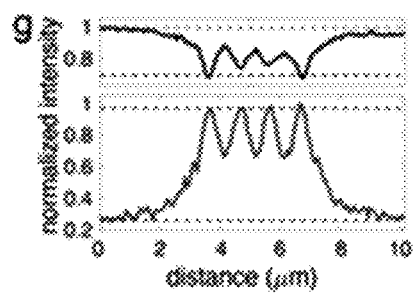
FIG. 5E   FIG. 5F   FIG. 5G

BRAGG LIGHT SOURCE FOR DARK-FIELD IMAGING DEVICES

RELATED APPLICATIONS

This application claims priority under 35 U.S.C. § 119 (e) to U.S. Provisional Application No. 62/980,504, filed Feb. 24, 2020, and entitled "Luminescent Surfaces with Tailored Angular Emission for Compact Dark-Field Imaging Devices," which is incorporated herein by reference in its entirety for all purposes.

GOVERNMENT SPONSORSHIP

This invention was made with Government support under Grant No. DMR1533985 awarded by the National Science Foundation and under Grant No. W911NF-13-D-0001 awarded by the Army Research Office. The Government has certain rights in this invention.

TECHNICAL FIELD

Sources of light for dark field microscopy and related methods are generally described.

BACKGROUND

Dark-field microscopy is an imaging technique that provides high image contrast for a broad range of specimens such as unstained specimens. Unlike bright-field microscopy, it accentuates high spatial frequencies and can therefore be used to emphasize and resolve small features. However, the use of dark-field microscopy for reliable analysis of some biological species, such as blood cells, bacteria, algae, and other marine organisms often requires specialized, bulky microscope systems, and expensive additional components, such as dark-field-compatible objectives or condensers. Accordingly, improved articles, systems, and methods are needed.

SUMMARY

Sources of light for dark field microscopy and related methods are generally described. The subject matter of the present disclosure involves, in some cases, interrelated products, alternative solutions to a particular problem, and/or a plurality of different uses of one or more systems and/or articles.

In one aspect, a dark field microscopy light source is described comprising a Bragg mirror having a light-receiving surface and a light-transmitting surface for directing light at an object, a reflector having a reflective surface facing the light-receiving surface of the Bragg mirror, and a light source positioned to emit light between the light-receiving surface of the Bragg mirror and the light-scattering reflective surface of the reflector.

In another aspect, a dark field microscopy system is described comprising a light source, an image collector, a support for positioning a specimen in a light path between the source and the collector, and a Bragg mirror in an optical pathway between the source and where the specimen is positioned by the support.

In another aspect, a method is described comprising exposing a Bragg mirror to light including a portion at a set wavelength and at a first incident angle relative to a Bragg mirror at which the Bragg mirror reflects more than 50% of the incident light as reflected light, without adjusting the Bragg mirror, causing the reflected light at the set wavelength to be re-directed at the Bragg mirror at a second incident angle relative to the Bragg mirror at which the Bragg mirror transmits more than 50% of the incident light, and using at least a portion of the light transmitted by the Bragg mirror as a dark field microscopy light source.

In another aspect, a method is described comprising exposing a Bragg mirror to non-directional light from a light source at a wavelength at which at least 50% of the light passes through the mirror only above a threshold incident angle, and passing at least 50% of the total light emitted by the light source through the Bragg mirror, and using at least a portion of the light transmitted by the Bragg mirror as a dark field microscopy light source.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 4A-4C show comparisons of the emission profiles of substrates with a flat bottom reflector (FIG. 4A) and micro-patterned reflecting bottom surface (FIG. 4B) and a polar plot (FIG. 4C) comparing the two specimens' angular emission profile extracted as an average of radial emission patterns from FIG. 4A and FIG. 4B with the curves representing data from the samples with patterned and flat bottom reflectors, respectively, according to one set of embodiments;

FIGS. 4D-4F show experimentally determined emission profile for a sample with patterned bottom reflector in air imaged with a 100× objective (NA=0.95) (FIG. 4D) and with the objective's numerical aperture marked with the white circle also showing corresponding modeling results for a Bragg reflector centred at 585 nm (FIG. 4E) and with a polar plot (FIG. 4F) extracted from FIG. 4D and FIG. 4E, according to one set of embodiments;

FIGS. 4G-4I show experimentally determined emission profiles for a sample with patterned bottom reflector in immersion oil imaged with a 100× objective (NA=1.3) (FIG. 4G) and corresponding modeling results for a Bragg reflector centred at 585 nm (FIG. 4H) with a polar plot (FIG. 4I) extracted from FIG. 4G and FIG. 4H, according to one set of embodiments;

FIGS. 5A-5M show schematics of the optical setup used for imaging in FIG. 5A where, in the case of biological samples, a drop of water containing the micro-organisms is deposited on the SLED surface and imaged using an immersion lens where SLED measurements rely on exposure of substrate with blue light from a laser diode and bright-field images and SLED images together with corresponding intensity profiles extracted along the white dashed lines are shown in FIGS. 5B-5D for a single colloid, FIGS. 5E-5G for a colloid cluster, FIGS. 5H-5J for a colony of *E. coli* bacteria in water, and FIGS. 5K-5M for micro-algae in sea water with scale bars: 1 µm for FIGS. 5B, 5C. 5E, 5F, 5 µm FIGS. 5H-5I, 10 µm FIGS. 5K-5L and with the dashed black lines in FIG. 5D, FIG. 5G, FIG. 5J, and FIG. 5M indicate the levels used to determine the image contrasts specified, according to one set of embodiments;

DETAILED DESCRIPTION

Figure 1A:
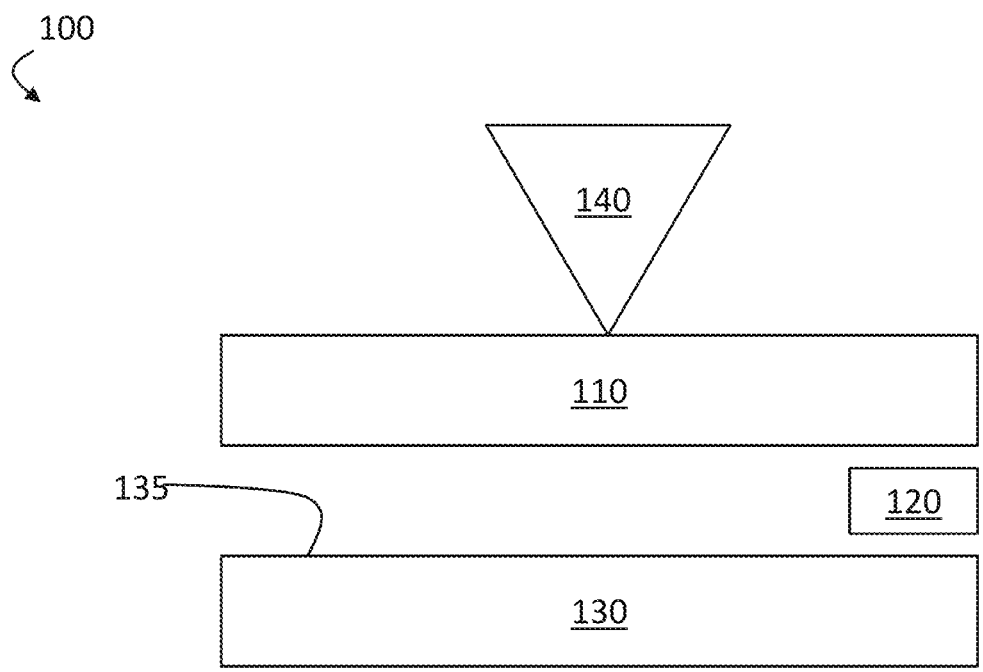
FIGS. 1A-1B are schematic cross-sectional side views of a dark field microscopy light source, according to some embodiments.

Dark field microscopy involves directing light at a specimen indirectly, then capturing light diffracted by the specimen toward a microscope objective, thereby observing an image with greater sensitivity and contrast then can sometimes be obtained via direct bright field light microscopy. The apparatus required to carry out typical known dark field microscopy is somewhat complex. In a typical arrangement, a light source, which might be aligned with an objective in typical microscopy, creates a generally cone shaped emission pattern, the central portion of which is physically blocked. Peripheral portions, initially not directed toward the objective, are re-routed by optical elements to pass through the specimen via a light pathway that is not directed at the objective. As noted above, the specimen diffracts light which is captured by the objective.

In dark-field microscopes, light is incident on the sample at oblique polar angles (measured with respect to the surface normal to the sample) that are larger than the objective's maximum light collection angle, $\theta_{max}$, given by the objective's numerical aperture NA=n sin $\theta_{max}$. Consequently, only light that is scattered by the sample into a cone of apex angle $2\theta_{max}$ centered around the microscope's optical axis is collected. Certain existing dark-field microscopes require a specialized filter cube and dedicated objectives or condensers, which permit shaping of the incident light cone. Dark-field objectives usually have a smaller numerical aperture than comparable bright-field objectives to ensure that specularly-reflected light is not collected. However, a smaller numerical aperture results in a reduced spatial resolution.

In this disclosure a simplified, compact, inexpensive device is described that can serve as a dark field microscopy light source while in some cases avoiding some aspects of prior dark field microscopy apparatus components.

Specifically, articles, systems, and methods for dark field microscopy are generally described herein. In some cases, dark field microscopy equipment (e.g., a dark field microscopy light source) can be simplified and downsized relative to certain existing dark field microscopy equipment to generate a high-angle illumination cone directly within the sample (e.g., a substrate) to enable dark field microscopy with simple microscopes that ordinarily would not be dark field compatible using existing systems and methods. However, using the dark field light sources, articles, systems, or methods described herein, simple microscopes can be enabled for dark field microscopy. For example, in some embodiments, a luminescent photonic substrate with a controlled angular emission profile is provided and can generate high-contrast dark-field images of micrometer-sized living organisms using standard optical microscopy equipment. In some embodiments, this substrate may form the basis for miniaturized lab-on-chip dark-field imaging devices.

In contrast to bright-field microscopy, which primarily relies on variations in optical absorption within the specimen to create image contrast, dark-field microscopy exploits the scattering of incident light from localized variations in refractive index. In some embodiments, this approach may provide a significant improvement in signal-to-noise ratio for weakly scattering materials. The articles, systems, and methods described herein using dark field microscopy may be particularly advantageous for specimens that display little or no absorption and allows for imaging of weakly scattering biological samples or, in some cases, metallic nanoparticles. Since dark-field microscopy is based on the rejection of incident and reflected unscattered light, only light that is scattered by the sample's features contribute to the image. Dark-field microscopy can emphasize high spatial frequency components associated with small features in the specimen morphology and, in some imaging scenarios, can provide resolution beyond the diffraction limit.

Plasmonic-based approaches have opened up new paths to overcoming the equipment complexity and size limitations of conventional dark-field microscopy. In some of these existing methods, evanescent surface plasmon waves are not captured in the far-field, which results in a dark background, but can be scattered into propagating far-field modes by objects within the surface plasmon field, which consequently appear bright. These techniques have clear advantages compared to some existing dark-field imaging devices, but they are not free of limitations. First, they rely on elaborate data analysis for the reconstruction of an image from scans of the sample surface, including deconvolution and noise reduction algorithms. Second, they involve additional complex optical components, which significantly increase the size of the whole imaging system and limit widespread implementation.

By contrast, certain embodiments described herein simplify and miniaturize dark-field microscopy instrumentation by integrating the dark-field light source into the sample substrate. In some embodiments, a luminescent micro-patterned photonic is introduced to the surface with a controlled angular emission profile. In some such embodiments, this type of substrate forms the basis for miniaturized lab-on-chip dark-field microscopy devices that are advantageously compatible with simple and compact light microscopes and do not require modification of the objectives of the microscope. In some cases, articles, systems, and methods can be referred to as substrate luminescence-enabled dark-field, or SLED.

In some embodiments, articles, systems, and methods include a Bragg mirror, optionally a reflector, and a light source positioned to emit light that passes through the Bragg mirror to create a light source for dark field microscopy. Where a reflector is used, the light source can be positioned between the Bragg mirror (e.g., a light-receiving surface 116 of the Bragg mirror) and a reflective surface 135 of the reflector (which can have a smooth surface or, in certain embodiments as described further below, can have a light-scattering reflective surface). For example, referring to FIG. 1A, a dark field microscopy light source 100 is shown, comprising a Bragg mirror 110 having a light-receiving surface 116, a light source 120, and a reflector 130 having a reflective surface 135. The light source 120 can produce light such that light is emitted from a light-emitting (e.g., light-transmitting) surface 118 of Bragg mirror 110.

As will be more fully understood from the description below, light from source 120 incident upon light-receiving surface 116 of Bragg mirror 110 can be directed toward light receiving surface 116 in any of a variety of angles. In one set of embodiments, light source 120 is non-directional, i.e., it can be a standard LED source or the like which emits in essentially all directions uniformly. But the light source need not emit in all directions uniformly. For example, it can emit in some directions more preferentially than others, but it need not direct light in the same direction or directions as the desired emission direction(s) of the light transmitting surface 118 of the Bragg mirror. In one set of embodiments, the arrangement produces angular light emission form the Bragg mirror, and, for example, can shape the transmitted light in a conical or annular manner with lower light intensity, or essentially no light, transmitted in a central direction perpendicular to the transmitting surface 118 of the Bragg mirror. For example, in FIG. 1A, the light transmitted through the Bragg mirror 110, may have an annular (e.g., ring-shape) cross section (not shown) in which little or no light is emitted in a central, dark region indicated by cone 140.

Figure 1B:
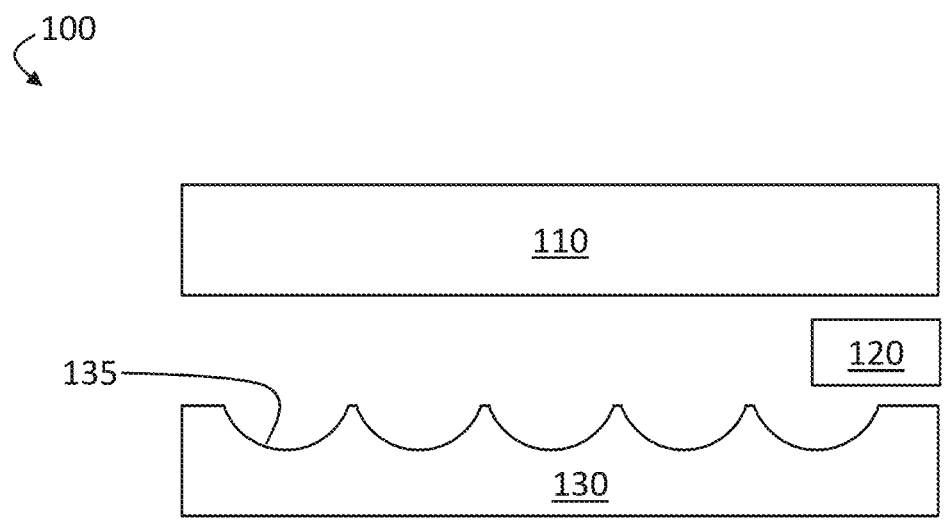

In some embodiments, the reflector has a patterned, textured, or roughened surface. For example, as shown in FIG. 1B, the reflector 130 has been patterned. Advantageously, patterning of the reflector surface can provide light emitted from the light source additional chances to reflect towards a light-receiving surface of the Bragg mirror, such that it has the proper orientation to transmit through the Bragg mirror with a desired angle such that the light transmitted has the proper orientation ($\theta_c$) to create a dark field light source (e.g., of an annular shape, of a conical shape, of an annular shape). This may beneficially increase the intensity of the light transmitted from the light-transmitting surface of the Bragg reflector when compared to light transmitted using a non-patterned reflector.

In embodiments in which reflective surface 135 of the reflector is a roughened, light-scattering surface, any such surface can be selected by those of ordinary skill in the art based on this disclosure. In one set of embodiments, as used herein a light-scattering, roughened surface is one where, if a laser is shined at the surface in a direction perpendicular to it, rather than the light being reflected in alignment with the original laser, i.e., specularly reflected in the original incident laser beam direction as would occur with a perfectly smooth reflective surface, in the case of the light-scattering surface at least 50% or in some embodiments 70%, 80%, 90%, 95%, or more than 99% of the original light is reflected at an angle relative to the original incident beam such that the reflected light does is not specularly reflected in the original incident beam.

Figure 2A:
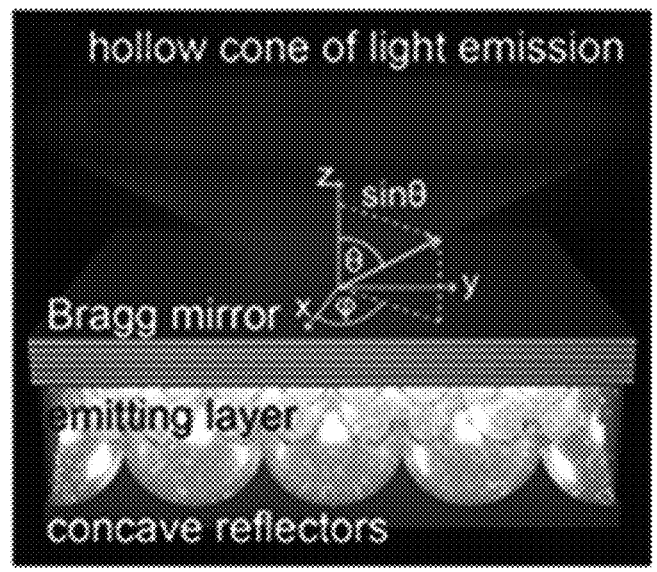
FIG. 2A shows 3D schematics of the device design, according to one set of embodiments.
Figure 2B:
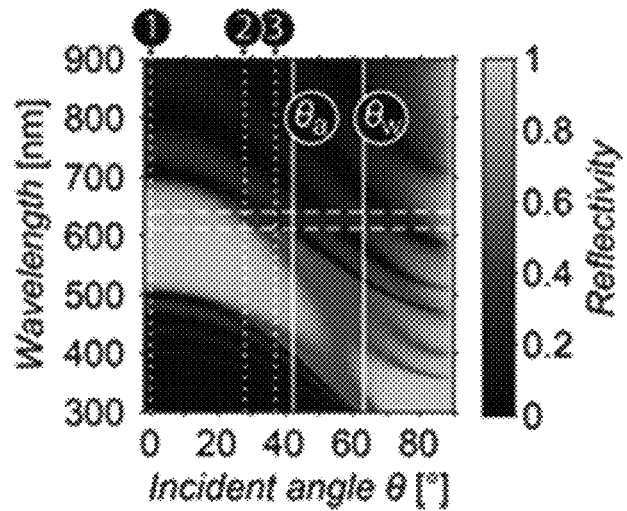
FIG. 2B shows a grey-scale encoded reflectivity of a Bragg mirror with a reflection band centered at 585 nm as a function of light incidence angle and wavelength where solid white vertical lines mark the critical angles $\theta_a$ and $\theta_w$ beyond which total internal reflection occurs if the upper medium is air or water and the spectral emission range of the QDs is marked with horizontal dashed white lines with overlays representing the angle ranges at which emitted light can escape from the Bragg reflector, according to some embodiments.
Figure 2C:
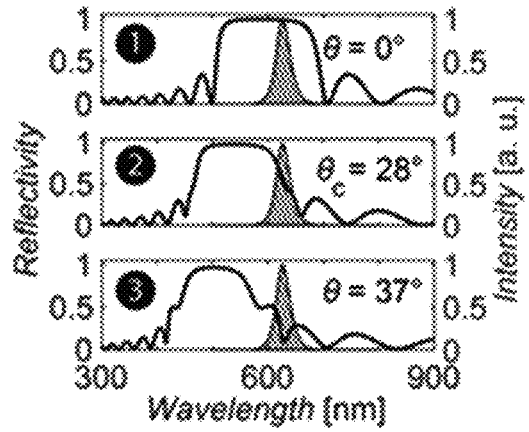
FIG. 2C shows selected spectra from FIG. 2B at incidence angles $\theta=0°$. $\theta_c=28°$ (where the Bragg reflector exhibits a reflectivity of 50% for the QD's spectral emission range), and $\theta=37°$, marked by dotted lines in FIG. 2B where the QD emission spectrum is represented as the shaded area, according to one set of embodiments.
Figure 2D:
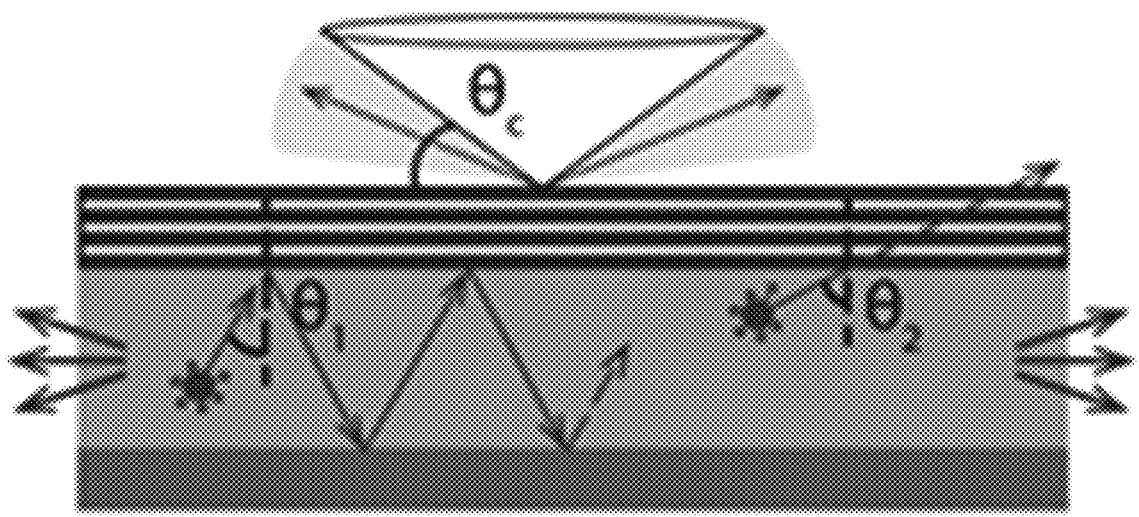
FIG. 2D is schematic depicting a possible optical path of a light beam emitted by a light source (e.g., QDs) in the case of a flat bottom reflector where if the light is emitted at an angle $\theta_1$ for which it is reflected by the Bragg mirror, the beam will keep bouncing between the two reflective surfaces, until it escapes at the sample edge and where a higher incidence angle $\theta_2$ light can couple out, according some embodiments.

Referring now to FIG. 2D, one arrangement of the light source of the invention is described. The light source (not illustrated in this figure but arranged as described elsewhere herein), creates light, some of which is largely or essentially reflected between the Bragg mirror and the reflector, and some of which, based upon its angle of incidence relative to the Bragg mirror, passes through the Bragg mirror and is emitted from the emission surface of the mirror. The result, with the Bragg mirror selected and arranged as those of ordinary skill in the art would do based on this disclosure, is light passing through the Bragg mirror at certain angles that do not include a central cone and/or a central region that would constitute a pathway in ordinary light microscopy, as is illustrated at the emitting surface of the Bragg mirror.

Figure 2E:
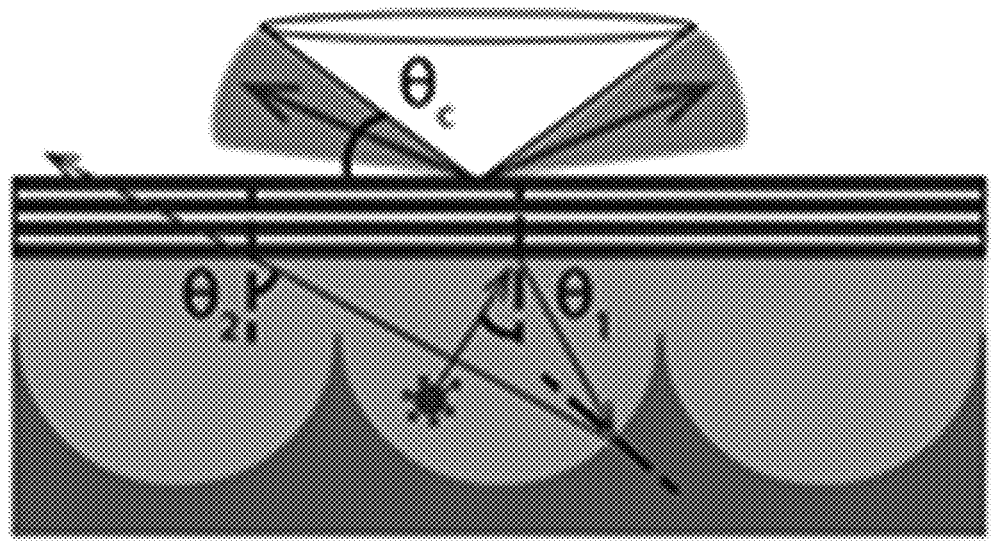
FIG. 2E shows the case of a bottom reflector patterned with semi-spherical cavities where the light emitted at an angle $\theta_1$ can—through scattering from the patterned bottom surface—reach an incident angle $\theta_2$ large enough to transmit through the Bragg reflector, according to some embodiments.

In the arrangement of FIG. 2E, the surface of the reflector is a patterned (e.g., roughened), light-scattering surface. In this arrangement, some or all of the light reflected from the light-receiving surface of the Bragg mirror is re-directed at the light-receiving surface of the Bragg mirror at a different angle at which it may pass. With enough internal reflection between the light receiving surface of the Bragg mirror and the roughened, light-scattering surface of the reflector, more light, in some embodiments a majority of light originally emitted from the light emitter, exits the light-emitting surface of the Bragg mirror at a useful angle for dark field microscopy.

In the patterned arrangement of 2E, light originally emitted from the light source but does not initially pass through the light-receiving surface of the Bragg mirror may become useful incident light for dark field microscopy than is the case in typical known dark field microscopy light sources in which the central portion of emitted light must be blocked because it is not initially directed at the appropriate angle or angles.

The arrangement of FIGS. 2D-2E are described in additional detail below with additional description of the optics involved.

Figure 1C:
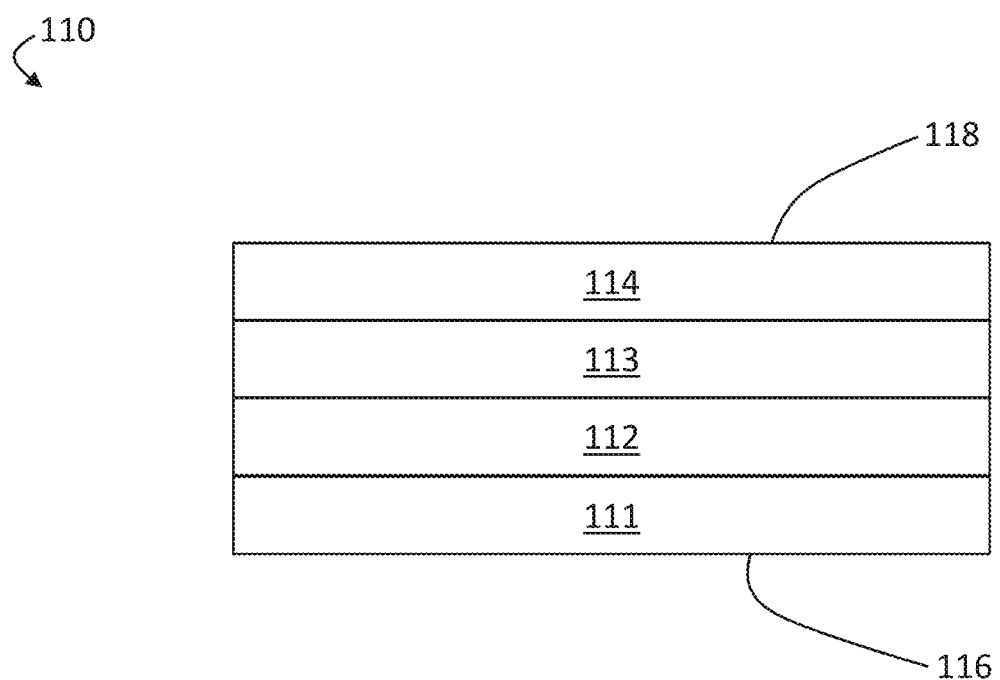
FIG. 1C is a schematic cross-sectional side view of a Bragg mirror, according to some embodiments.

A Bragg mirror, (e.g., a distributed Bragg reflector) is used as generally understood in the art, and in one set of embodiments is an article with a structure formed from multiple layers of alternating materials with varying refractive indices or with periodic variation of some characteristic (such as height) of a dielectric waveguide and results in periodic variation in the effective refractive index of the mirror. For example, in FIG. 1C, the Bragg mirror 110 comprises layers 111, 112, 113, and 114. Each layer may be of the same or independently different material. Each layer boundary causes a partial reflection of an optical wave (e.g., incident light). In some embodiments, the Bragg mirror may have a light-receiving surface 116 defined by the bottom most layer of the Bragg mirror. For example, in FIG. 1C, a light-receiving surface 116 is at a surface of the bottom most layer (e.g., layer 111). In some embodiments, the Bragg mirror may have a light-transmitting surface 118 defined by the top most layer of the Bragg mirror. For example, in FIG. 1C, a light-transmitting surface 118 is at a surface of the top most layer (e.g., layer 114). However, it should be understood that in some cases, any of the layers of the Bragg mirror can define a light-receiving or a light transmitting surface.

In some embodiments, the Bragg mirror has greater than or equal to 2 layers, greater than or equal to 5 layers, greater than or equal to 10 layers, greater than or equal to 20 layers, greater than or equal to 30 layers, greater than or equal to 40 layers, or greater than or equal to 50 layers. In some embodiments, the Bragg mirror has less than or equal to 50 layers, less than or equal to 40 layers, less than or equal to 30 layers, less than or equal to 20 layers, less than or equal to 10 layers, less than or equal to 5 layers, or less than or equal to 2 layers. Combinations of the above-referenced ranges are also possible (e.g., greater than or equal to 2 layers and less than or equal to 10 layers). Other ranges are possible.

The Bragg mirror (e.g., the layers of the Bragg mirror) may be any suitable material. In some embodiments, the layers of the Bragg mirror may be the same or independently different to provide transmitted light of a desired angular intensity and wavelength distribution, which, in turn, can determine the shape and size of the transmitted light through the Bragg mirror. In some cases, the materials are selected to have a particular refractive index and/or thickness, which can be used to determine the angular intensity and wavelength distribution of the light transmitted from the light-transmitting surface of the Bragg mirror. Those skilled in the art based on the teachings of the present disclosure will be able to select appropriate materials for the Bragg mirror or layers of the Bragg mirror.

In some embodiments, the material of the Bragg mirror comprises a ceramic material. Non-limiting examples of ceramic materials include metal oxides, such as titanium oxide, silicon oxide, and aluminum oxide. Additional non-limiting examples of ceramic materials include metal nitrides, such as silicon nitride. Other ceramic materials are possible. In some embodiments, the Bragg material is a glass.

In some embodiments, the material of the Bragg mirror (e.g., a layer of the Bragg mirror) is a polymeric material. Non-limiting examples of polymeric materials include polystyrene, polytetrafluoroethylene (PTFE), polymethylmethacrylate, polyisoprene, and polydimethylsiloxane (PDMS). Additional non-limiting examples of polymers include thermoplastics, elastomers, polyurethanes, chitin-containing polymers, cellulose derivatives, and waxes. Other polymeric materials are possible.

With the description as provided here in, those of ordinary skill in the art can readily select and arrange additional optical components to achieve dark field microscopy.

As mentioned above, light source 120 can be any suitable light source, and those skilled in the art based on the teachings of the present disclosure are capable of selecting an appropriate light source. In some embodiments, the light source is selected to provide an appropriate wavelength for providing the appropriate resolution of an object receiving light from the light-transmitting surface of the Bragg mirror. In some embodiments, the light source comprises quantum dots (QDs). In some embodiments, the light source comprises light-emitting diodes (LEDs) and/or organic light-emitting devices (OLEDs). In some embodiments, the light source comprises a laser. Other light sources are possible.

In some embodiments, a Bragg mirror is exposed to non-directional light from light source 120 at a wavelength at which at least 50% of the light passes through the mirror only above a threshold incident angle. The Bragg mirror (e.g., the layers of the Bragg mirror) can be selected or configured to select a desired threshold incident angle.

In some embodiments, at least 50% of the total light emitted by the light source passes through the Bragg mirror. In some embodiments at least 60%, at least 70%, at least 80%, at least 90%, at least 95%, or at least 99% of the total light emitted by the light source passes through the Bragg mirror. In some embodiments, no greater than 99%, no greater than 95%, no greater than 90%, no greater than 80%, no greater than 70%, no greater than 60%, or no greater than 50% of the total light emitted by the light source passes through the Bragg mirror. Combinations of the above-referenced ranges are also possible (e.g., at least 50% and no greater than 99% of the total light emitted by the light source passes through the Bragg mirror). Other ranges are possible.

In some embodiments, articles, systems, and methods herein comprise a reflector. The reflector can be positioned to reflect light of the light source towards a light-receiving surface of the Bragg mirror. The reflector can be any suitable surface for reflecting light. In some embodiments, the reflector comprises a reflective material. Non-limiting examples of reflective materials include glass, mirrors, and metallic surfaces (e.g., silver, aluminum, gold). In some embodiments, a reflector (e.g., a patterned reflector) comprises a coating (e.g., a metallic layer) adjacent to the reflector to provide or enhance the reflection of the reflective surface.

In some embodiments, the reflector can be relatively smooth and comprise a low RMS surface roughness. In some embodiments, the RMS surface roughness is less than or equal to 10 nanometers, less than or equal to 9 nanometers, less than or equal to 8 nanometers, less than or equal to 7 nanometers, less than or equal to 6 nanometers, less than or equal to 5 nanometers, less than or equal to 4 nanometers, less than or equal to 3 nanometers, less than or equal to 2 nanometers, or less than or equal to 1 nanometer. In some embodiments, the RMS surface roughness is greater than or equal to 1 nanometer, greater than or equal to 2 nanometers, greater than or equal to 3 nanometers, greater than or equal to 4 nanometers, greater than or equal to 5 nanometers, greater than or equal to 6 nanometers, greater than or equal to 7 nanometers, greater than or equal to 8 nanometers, greater than or equal to 9 nanometers, or greater than or equal to 10 nanometers. Combinations of the above-referenced ranges are also possible (e.g., greater than or equal to 1 nanometer and less than or equal to 10 nanometers). Other ranges are possible. It should also be understood that while reflectors can be relatively smooth, in other embodiments, the reflector can have a relatively rough surface, as this disclosure is not so limited.

In some embodiments, the reflector can be patterned or have a has a plurality of periodic features (e.g., gratings). For example, FIG. 1B shows a patterned reflector, reflector 130. The patterning may increase the chances for light (e.g., light from the light source) to reflect to scatter with the right angle such that the light is received by the Bragg mirror. In some embodiments, the spacing between the patterning or grating is greater than or equal to 100 nanometers, greater than or equal to 200 nanometers, greater than or equal to 300 nanometers, greater than or equal to 400 nanometers, greater than or equal to 500 nanometers, greater than or equal to 750 nanometers, greater than or equal to 1 micron, greater than or equal to 5 microns, greater than or equal to 10 microns, greater than or equal to 25 microns, or greater than or equal to 50 microns. In some embodiments, the spacing between the patterning or gratings is less than or equal to 50 microns, less than or equal to 25 microns, less than or equal to 10 microns, less than or equal to 5 microns, less than or equal to 1 micron, less than or equal to 750 nanometers, less than or equal to 500 nanometers, less than or equal to 400 nanometers, less than or equal to 300 nanometers, less than or equal to 200 nanometers, or less than or equal to 100 nanometers. Combinations of the above-referenced ranges are also possible (e.g., greater than or equal to 100 nanometers and less than or equal to 50 microns). Other ranges are possible.

In some embodiments, the reflector (e.g., the reflective surface of the reflector) is patterned or roughened such that is has no long-ranged order (e.g., disordered, random). In some embodiments, the reflector has a RMS surface roughness of greater than or equal to 50 nanometers, greater than or equal to 100 nanometers, greater than or equal to 250 nanometers, greater than or equal to 500 nanometers, greater than or equal to 750 nanometers, greater than or equal to 1 micron, greater than or equal to 10 microns, greater than or equal to 20 microns, greater than or equal to 25 microns, greater than or equal to 50 microns, greater than or equal to 75 microns, or greater than or equal to 100 microns. In some embodiments, the reflector has a RMS surface roughness of less than or equal to 100 microns, less than or equal to 75 microns, less than or equal to 50 microns, less than or equal to 25 microns, less than or equal to 20 microns, less than or equal to 10 microns, less than or equal to 1 micron, less than or equal to 750 nanometers, less than or equal to 500 nanometers, less than or equal to 250 nanometers, less than or equal to 100 nanometers, or less than or equal to 50 nanometers. Combinations of the above-referenced ranges are also possible (e.g., greater than or equal to 100 nanometers and less than or equal to 100 microns). Other ranges are possible.

In some embodiments, the light emitted by the substrate is confined to high polar angle ranges due to the interplay between three different structural components: (1) a flat Bragg mirror that by its spectrally selective and angle-dependent transmission characteristics determines the surfaces' angular emission profile; (2) a light-emitting layer beneath the Bragg reflector, which, for example, in some systems is composed of light-emitting cadmium selenide/cadmium sulfide (CdSe/CdS) core-shell quantum dots (QDs) dispersed in a poly(methyl methacrylate) matrix; (3) a micro-patterned bottom reflector underneath the light-emitting layer to recycle light into propagation angle ranges that are transmitted by the Bragg reflector (FIG. 2A). Without wishing to be bound by any particular theory, the design is inspired by color mixing structures found in the wing scales of Papilio butterflies and builds on recent findings on how to enhance the underlying optical effects in bio-inspired materials. In some cases, this dark-field imaging technique is called "substrate luminescence-enabled dark field" imaging (short SLED), which relies on the unique light-emission characteristics of the substrate.

In some embodiments, an image collector may be present. The image collector can be used to collect an image of an object or sample to which a dark field light source as described herein has been applied. In some embodiments, the image collector is the object of a light microscope.

However, other image collectors are possible, such as a camera, fiber optics, a lens, without limitation.

The articles, systems, and methods described herein may be suitable for viewing the dark field image of any suitable object or sample. In some embodiments, the sample is of the micro-scale or smaller, such as algae, bacteria, and the like. However, other samples are suitable for viewing, and those of ordinary skill in the art based on the teachings of the present disclosure will be able to select suitable objects or samples for viewing with the dark field microscopy articles, systems, and methods described herein.

The following examples are intended to illustrate certain embodiments of the present invention, but do not exemplify the full scope of the invention.

Example 1

The following example describes the fabrication of dark field microscopy light sources.

Methods

Fabrication of Micro-Patterned Bottom Reflectors

A glass master covered with convex hexagonally-packed semi-spheres with a diameter of 4.6 μm was fabricated. A first molding step was performed by casting polydimethylsiloxane (PDMS) Sylgard 184® from Dow Corning after mixing the elastomer base and the curing agent in a weight ratio 10:1. After curing for 3 hours at 70° C. the PDMS was carefully peeled off from the master, revealing the inverted structure (hexagonally-packed semi-spherical concavities). To perform PDMS double-casting, the elastomer master was plasma-etched with oxygen for 10 seconds before being left for a minimum of 3 hours in a desiccator with a few drops of Aquapel® Glass Treatment on a glass slide. This commercial fluorinated compound increases the hydrophobicity of the PDMS elastomer to enable PDMS double-casting. Then, a new mixture of Sylgard 184® was casted on the treated PDMS master and cured for 3 hours at 70° C. It could be easily peeled off from the initial PDMS master and preserved the geometry of the structure, creating an imprint as on the initial glass master. Last, high-temperature resistant optical epoxy OG142-87 from Epotek® was cast on the final PDMS mold cured under UV light for 3 hours and easily peeled off to obtain a hard, micro-patterned sample covered with hexagonally-packed semi-spherical concavities. The temperature resistance of the epoxy is an important factor for the next fabrication step of electron-beam evaporation of a gold coating that involves working at high temperature (about 100° C.), where other common polymers start expanding, affecting the quality of the thin film deposited on it. The PDMS masters were reused up to 8 times without any noticeable degradation of the micro-structure. The Aquapel®-fluorinated PDMS master could be reused without any further treatment for PDMS double-casting, even a month after its first replication.

Electron-Beam Evaporation of Gold on the Patterned Epoxy

Patterned epoxy samples were coated with a 15 nm thick seed layer of titanium and 200 nm of gold by e-beam evaporation. All deposition materials were purchased from Kurt J. Lesker®. The deposition was performed with an e-beam evaporator AJA ATC, in the clean room of the Exploratory Materials Laboratory (EML) of the Microsystems Technology Laboratories (MTL) at MIT. The deposited thickness was determined with a Dektak® 150 mechanical surface profilometer and through SEM cross-section imaging.

Spin-Coating of the Quantum Dot Polymer Matrix

Poly(methyl methacrylate) (PMMA, average molecular weight 15,000 g/mol determined by GPC) and toluene (anhydrous 99.8%) were purchased from Sigma-Aldrich® and used without any further purification. The quantum dots (QD) were synthesized in the Bawendi group at the MIT Department of Chemistry following the synthesis reported by Coropceanu et al. The photoluminescence emission peak of the QDs in solution was located at a wavelength of 630 nm. PMMA powder was mixed at 25 wt. % in toluene and stirred until fully dissolved. The solution was then filtered and added to a vial containing dry QDs to obtain 5 wt. % of QDs in the PMMA-toluene solution. The mixture was stirred for a few minutes, until the QDs were fully dispersed. Using a spin coater (Laurell Technologies® WS-650MZ-23NPP), 200 μL of the final solution was spin-coated on the gold patterned surface at 2000 rpm, until the solvent fully evaporated and the color of the film did not change anymore.

Bragg Reflector Fabrication by Electron-Beam Evaporation and Assembly

Titania ($TiO_2$) and silica ($SiO_2$) used for the deposition were purchased from Kurt J. Lesker®. The e-beam evaporation was performed on the same equipment used for the deposition of gold on the patterned surface. Bragg reflectors were obtained by alternating 13 layers of $TiO_2$ and $SiO_2$, always starting and finishing with a $TiO_2$ layer, as it is the higher refractive index material. The Bragg reflectors can be deposited directly on top of the PMMA/QDs-covered metal bottom reflectors. Alternatively, they can be formed on thin glass coverslips. The coverslips can then be cut and assembled with the QD/PMMA coated bottom reflectors by putting them in physical contact—with the Bragg reflector side on the PMMA film—and fusing them in a toluene environment for approximately an hour. Thicknesses and refractive indices of the constituent layers in the multilayer reflectors were measured using a custom-made ellipsometer. In addition, the thicknesses were confirmed via profilometry performed with a Dektak® 150 mechanical surface profilometer and through SEM cross-section imaging. For our samples, the refractive indices were 2.2±0.02 for $TiO_2$ and 1.49±0.01 for $SiO_2$.

Optical Characterization Setup

Optical measurements were performed on an Olympus® $Bx_{51}$ optical microscope. Images were acquired with an RGB Allied Vision Technologies® Prosilica GT camera mounted on the microscope's imaging port. A high NA oil immersion lens (Olympus UPlanFL 100×/1.30 oil) and a regular air objective (UMPlanFl 100×/0.95) in conjunction with a Bertrand lens were used to image the samples' angular emission profiles. The excitation source was a Sony® SLD3236VF laser diode, used with a Thorlabs® ITC4005 laser controller. The beam created by the laser diode was collimated through a 30 mm focal length lens and its position and angle was controlled with two adjustable 45° mirrors before coupling it into the optical microscope. A customized microscope filter cube consisting of a short-pass filter (<450 nm, Thorlabs® FESH0450), a long-pass dichroic mirror (>425 nm, Thorlabs® DMLP425R) and a long-pass filter (>570 nm, Thorlabs® FGL570) was also used. The standard excitation power used to excite the QDs was <5 mW to avoid heating and intensity variation of the laser diode. In addition, some tests were run with an excitation power up to 20 mW without witnessing any photobleaching of the QDs. A 60× water immersion lens (Olympus (LUMPlanFl N 60×/1.00 w) was used for the imaging of marine micro-organisms and bacteria.

Optical Modeling

Modelling of the emission characteristics of the sample geometries with spherical concavities, flat surfaces, and randomly rough surfaces with a Gaussian height distribution was performed using a custom Matlab code. This code allows to calculate the reflection and transmission characteristics of the top Bragg reflector based on Rouard's method[25], while employing ray tracing to model light propagation within the structures and reflection of the bottom gold surface (taking into account the wavelength-dependent refractive indices and absorption coefficients of gold[26]). To assess the emission characteristics of the different geometries we generated 100.000 rays of random position and direction within the volume enclosed by the Bragg filter and the bottom gold reflectors. We assumed incoherent superposition of different rays emitted from the surface in the same angular direction, i.e. adding their intensities, since we expect no phase relation between light that is emitted fluorescently from different points within the cavity structures. The number of 100,000 rays was chosen after testing for selected geometries that the resulting emission profiles had converged to the same result as for modelling runs with 150,000 and 200,000 rays. The theoretical modelling of image formation with partially coherent light is described in detail in the supplementary information.

SLED Fabrication and Performance

To evaluate the potential of this substrate design for integrated dark-field microscopy devices, the surface's optical performance was first investigated theoretically. A custom-made optical modelling environment developed in MATLAB allowed the study of the optical behavior and interplay of individual structural components. The system's Bragg reflector was modeled with 13 layers of titanium dioxide ($TiO_2$, refractive index $n_{TiO_2}$=2.2) and silicon dioxide ($SiO_2$, $n_{SiO_2}$=1.49) to match the structure and parameters that were subsequently realized experimentally; its reflection characteristics are found using Rouard's technique. By tuning the layer thicknesses in the Bragg reflector, the spectral position of its reflection band is matched to the experimentally determined emission spectrum of the QDs light source, which only permits light to escape at large polar angles. In other words, the light emitted by the QDs was reflected back into the polymer matrix, unless its propagation angle (with respect to the Bragg reflector's normal surface) is larger than a critical angle $\theta_C$ and smaller than the critical angles of total internal reflection $\theta_A$ for air and $\theta_W$ for water as the imaging medium (FIG. 2B, 2C). This angle can be determined by the design of the Bragg reflector and the emission wavelength of the light source (e.g., quantum dots). The luminescent substrate thus channels all light into a hollow emission cone with minimum and maximum apex angle defined by the Bragg mirror's reflection band.

A custom 3D ray-tracing code was used to model the light propagation within the QD-doped polymer medium between the Bragg reflector and the concave reflectors forming the gold-coated micro-patterned bottom surface, taking into account the spectrally varying refractive index and absorption coefficient of gold. An assumption could be made that the concentration of QDs was small enough to not affect the refractive index of the PMMA layer. Combining wave optics-based modeling (e.g., Rouard's technique) to establish the interactions of light with the Bragg reflector and geometrical optics-based approaches (e.g., ray-tracing) to approximate light propagation within the semi-spherical cavities and obtained an estimate of the optical response of the complete structure composed of Bragg reflector, light-emitting QDs, and micro-patterned metallic bottom surface.

Figure 2F:
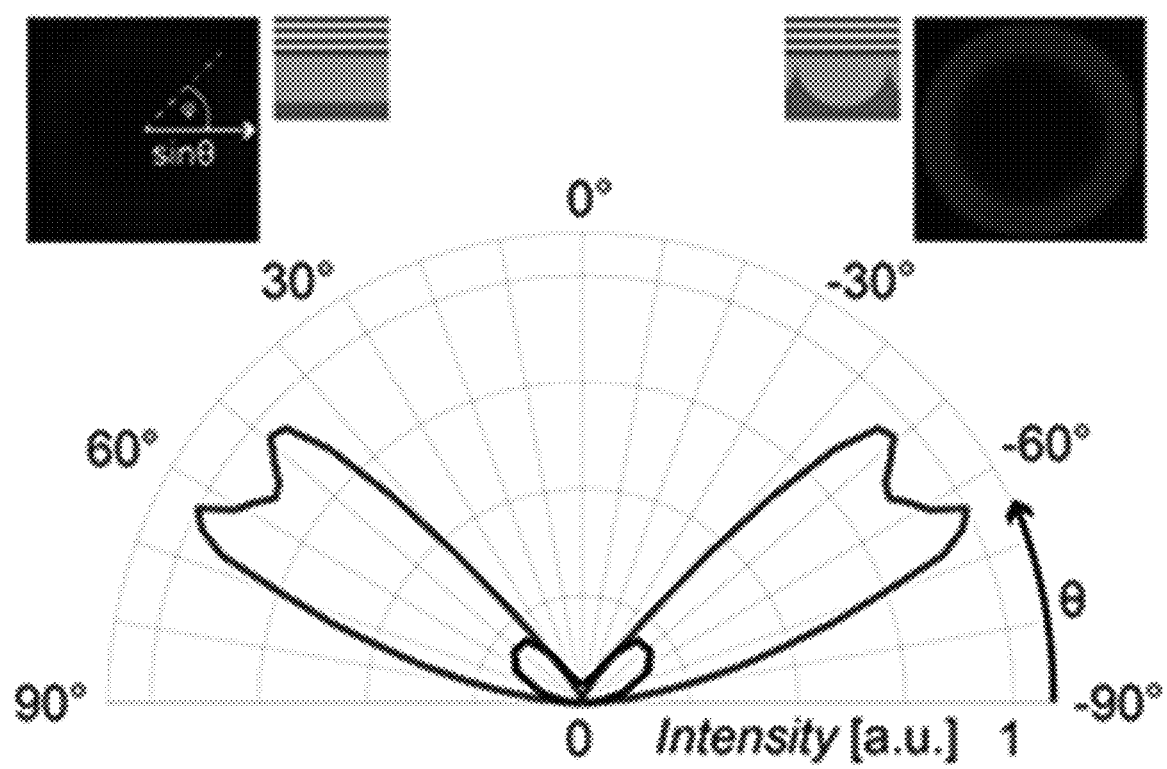
FIG. 2F shows simulated angular emission profiles comparing the angle-dependent intensity of light emitted by a substrate with flat bottom reflector and a substrate with a micro-patterned bottom reflector where the insets show visualizations of the emitted light intensity and color as a function of the angle of incidence onto the Bragg reflector, which increases from 0° at the images's center to 90° at the edges, according to some embodiments.
Figure 2G:
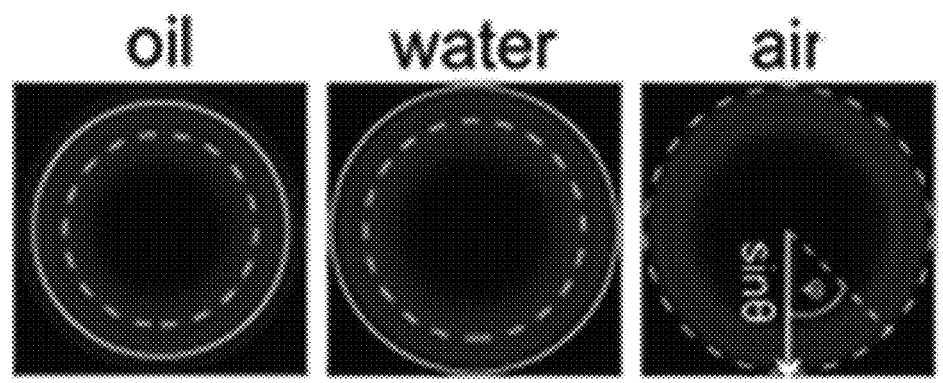
FIG. 2G shows emission profiles in air, water, and oil where the dashed line corresponds to an output angle of 90° in air, while the solid line corresponds to 90° in water, according to some embodiments.

A comparison of the theoretical emission characteristics of two different designs, one with a patterned and one with a flat gold bottom surface, indicates that the micro-patterns drastically amplify the intensity of light emitted at high angles. In a structure with a flat reflecting bottom surface, most of the emitted light is coupled out from the substrate's side edges (FIG. 2D). On the contrary, substrates featuring concave, hemispherical cavities recycle the majority of light reflected by the Bragg mirror, until it impinges on the Bragg reflector at an angle larger than $\theta_C$, at which point the light escapes (FIG. 2E). Therefore, light can exit from the top of the surface after multiple reflections from the micro-patterned surface. In some cases, this redistribution of light into incidence angle ranges for which the Bragg reflector is transmissive enables a much more intense wide-angle illumination compared to a flat gold bottom surface for identical QD excitation strength (FIG. 2F). Finally, optical modeling could help in the design the Bragg-filter's reflection band so that the substrate's angular emission profile forms a hollow emission cone located in any desired polar angle range. To use the substrates for dark-field microscopy with common bright-field objectives, the emission angle range should be located outside of the objective's numerical aperture. As expected, the emission profile depends on the medium above the device. We based this design on three media common in optical microscopy, air, water, and oil, as well as on the numerical aperture of the high NA objectives commonly available to validate this proposed concept experimentally (FIG. 2G).

Figure 3A:
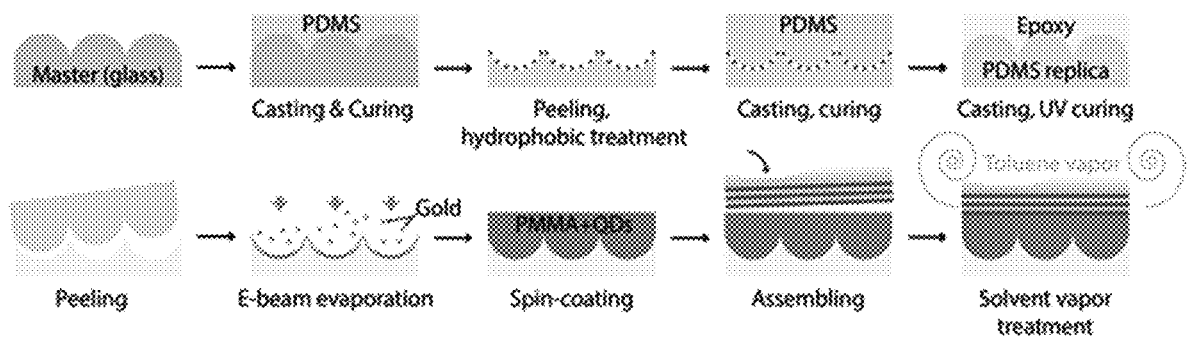
FIG. 3A shows a schematic of the manufacturing procedure where the patterned epoxy substrate was obtained by a three-step replica moulding procedure, consisting of casting PDMS on a glass master, PDMS casting on PDMS, and epoxy casting on the PDMS replica followed by assembling the SLED surface by adding the metal reflector, QDs light source, and the Bragg reflector on top of the patterned epoxy, according to some embodiments.

To experimentally demonstrate the proposed substrate luminescence-enabled dark-field imaging technique, a repeatable fabrication technique was developed to create surfaces with various controlled light emission profiles (FIG. 3A). The structure's optical properties can be altered by modifying the design parameters: First, changing the QD type or mixing different QDs together allows for adjustment of the emission spectrum. Second, the thickness of individual oxide layers in the Bragg reflector can be varied to modify the angular emission profile associated with a specific spectral emission range. Finally, the geometry of the micro-patterned bottom reflector can also be modified to change the angular distribution of the emitted light intensity within the angle range for which the Bragg reflector allows light to transmit.

Figure 3B:
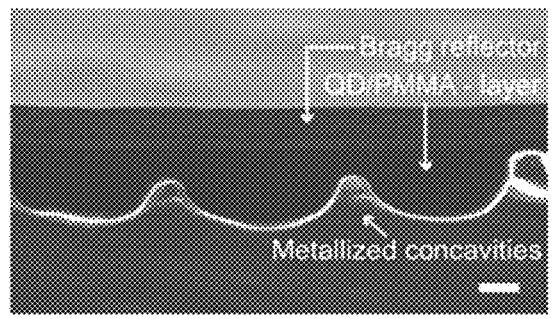
FIG. 3B shows a cross-sectional SEM view of the SLED device showing the patterned bottom surface, the QD-doped PMMA layer and the Bragg reflector, with scale bar: 1 µm, according to some embodiments.
Figure 3C:
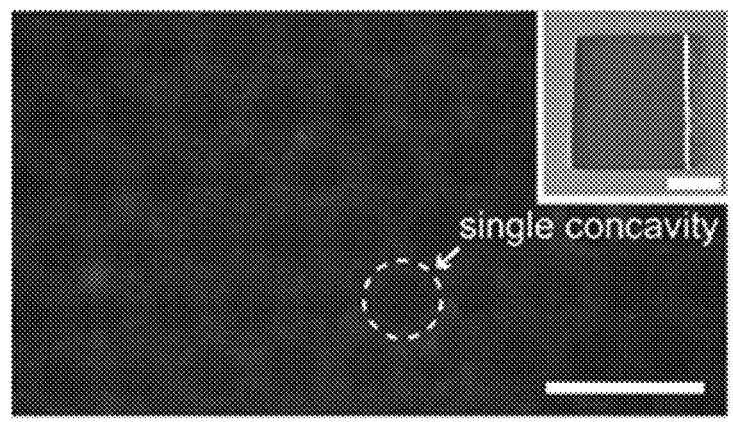
FIG. 3C shows a top view of the complete device obtained by fluorescence microscopy with the microscope's focus plane on the bottom reflector with scale bar: 10 µm with the inset shows a macroscopic top-view of the assembled SLED surface with scale bar: 1 mm, according to some embodiments.
Figure 5H:
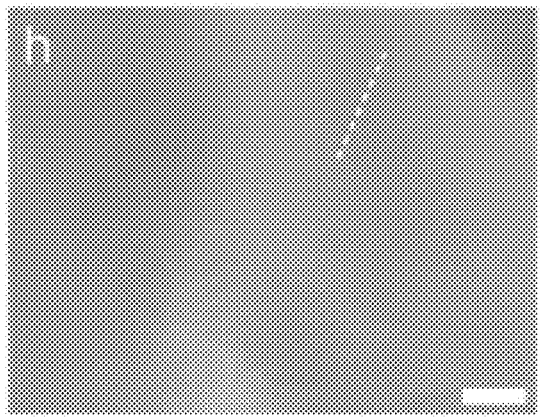
Figure 5K:
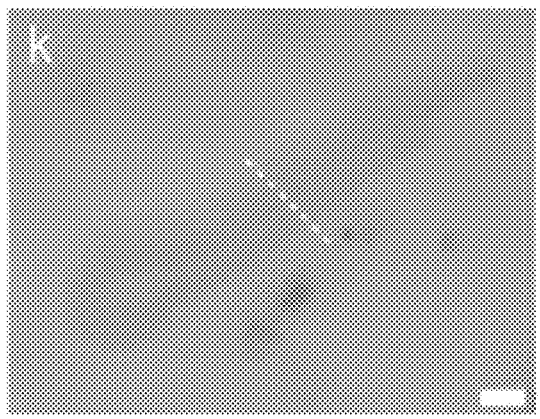
Figure 5I:
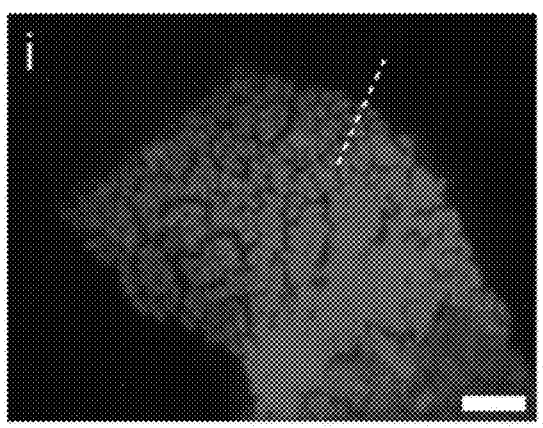
Figure 5L:
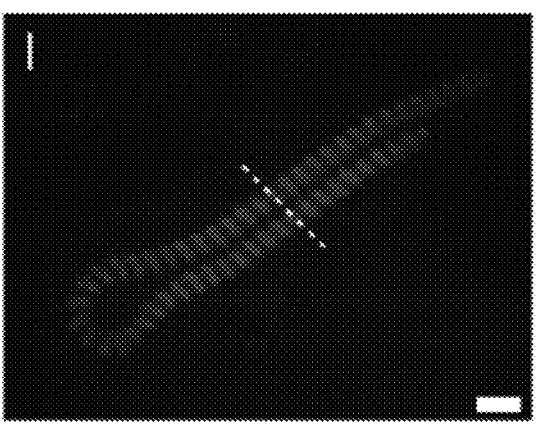
Figure 5J:
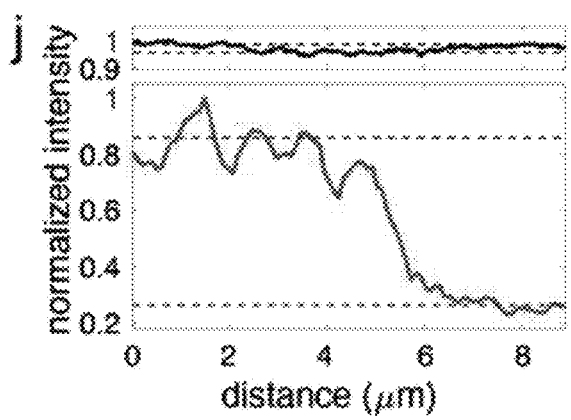
Figure 5M:
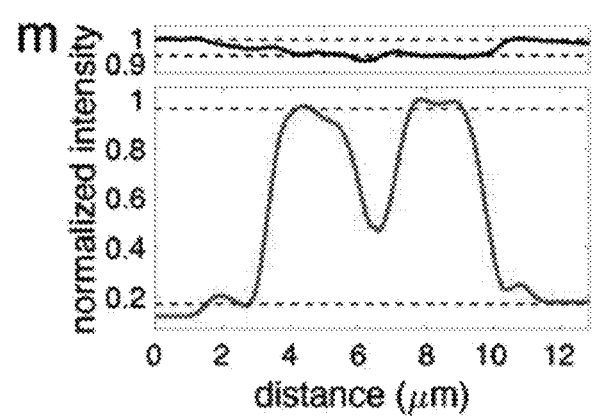

A cross-section of a representative sample obtained by scanning electron microscopy (SEM) showed that the micro-scale concavities filled with the QD-containing polymer matrix topped off by the Bragg reflector (FIG. 3B). Based on theoretical investigations, the Bragg reflector was designed to have a bandgap centered at 585 nm to achieve a hollow emission cone with the large apex angle needed for dark-field imaging, while still allowing us to characterize the surface's optical properties using high NA objectives. A laser diode with an emission wavelength of λ=405 nm (CW, output power 5 mW. Sony) was used to excite the QD's in the sample, resulting in light emission in the red spectral range (FIG. 3C).

The concept of enhancing the surface's emission characteristics using micro-patterned bottom structures was evaluated by comparing the emission resulting from a device with a flat gold reflector at the bottom with the emission from a design with a micro-patterned reflective bottom surface. Both samples were excited with the laser diode at an incident power of <5 mW at the surface of the sample. The sample with the patterned bottom surface shows a significantly higher emission intensity and signal-to-noise ratio compared to the substrate with a flat bottom reflector (FIG. 4A, 4C), in excellent agreement with the optical modelling (FIG. 2F). Furthermore, the surfaces' emission profiles in air and in immersion oil match the predicted optical response in these media (FIG. 4d-4I). The experimental data is truncated at higher angles due to the limited numerical aperture of the microscope objectives (marked by the white ring in FIGS. 4D, 4E, 4G, 4H). It is noted that the experimentally obtained angular emission profile in air deviates from the predictions at lower angles (FIG. 4F). It is speculated that this escape of light from the Bragg reflector at lower angles is indicative of scattering defects in the Bragg reflector layers.

To demonstrate the utility of the proposed luminescent surfaces for dark-field microscopy, colloids and biological samples with low refractive index contrast were imaged (FIG. 5). The Bragg reflector was designed to obtain optimal optical performances for use with a 100× air objective (NA=0.9) and a 60× water-immersion objective (NA=1.0) (FIG. 5A). Images obtained with standard bright-field microscopy and with the SLED approach are compared to demonstrate the ability of the substrates to provide high-contrast images for specimen with little absorption and low refractive index contrast (FIGS. 5B-5I). First, using the 100× air objective, 1-μm polystyrene colloids were imaged in both bright-field and with SLED (FIGS. 5B-5G). Images obtained by SLED show the reciprocal intensity profile to one obtained by bright-field microscopy, hence demonstrating the dark-field character of the described approach. The image contrast, calculated as the difference between the maximum and minimum image intensity values divided by their sum, was significantly improved when the colloids were imaged with SLED (FIGS. 5D, 5G). While bright-field illumination resulted in a contrast of 0.20±0.01 (mean±std. dev.). SLED illumination provided a contrast of 0.60±0.02.

Second, a drop of water containing marine micro-organisms or *Escherichia coli* (short *E. coli*) was positioned on top of the light-emitting surface and imaged with the water immersion lens (FIGS. 5F-5I). In the case of biological samples, which due to weak absorption and low refractive index contrast in water are difficult to image with bright-field illumination, the contrast improvement obtained with SLED is even more striking. For the *E. coli* sample, bright-field illumination only provided a contrast of 0.021±0.003, while SLED light enabled an image contrast of 0.57±0.02. The contrast enhancement when imaging marine micro-organisms (FIGS. 5K-5M) was similarly high; SLED illumination resulted in a contrast of 0.76±0.03, while for bright-field light it was only 0.040±0.004. Hence, SLED illumination permits the visualization of sub-micron features in weakly or non-absorbing specimen with low refractive index difference to the surrounding medium, which could not be easily imaged using bright-field microscopy and standard numerical contrast enhancement techniques.

Figure 6A:
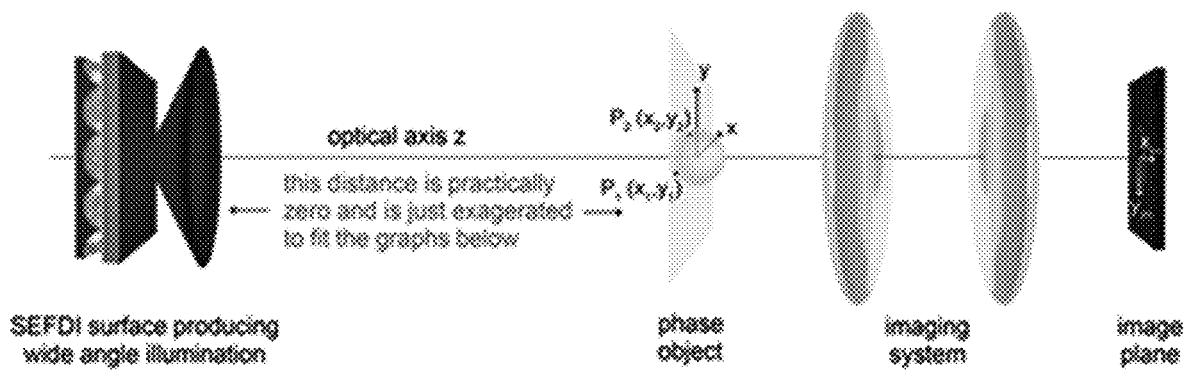
FIG. 6A shows schematics showing the sequence of optical elements in the imaging experiments where, from left to right, SLED surface—phase object—4f-imaging system, schematically represented by two lenses—image plane, where the camera is positioned, according to some embodiments.
Figure 6B:
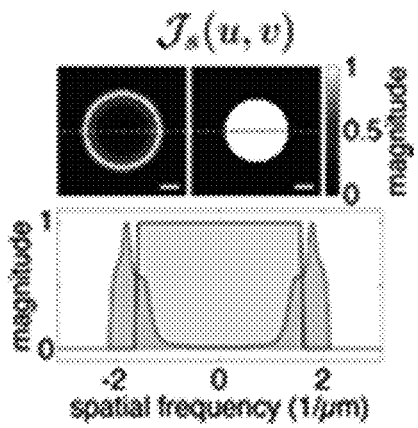
FIG. 6B shows the angular spectrum $\mathcal{J}_s(u, v)$, where u, v are the spatial frequencies and with the graphs on the top show $\mathcal{J}_s$ for the SLED surface (left) and for bright-field illumination through a water objective with numerical aperture 1.0 (right); scale bar-1/µm and where the bottom graph displays normalized magnitudes of $\mathcal{J}_s$ for the SLED surface and bright-field illumination acquired along the dashed lines in the top graphs, according to one set of embodiments.
Figure 6C:
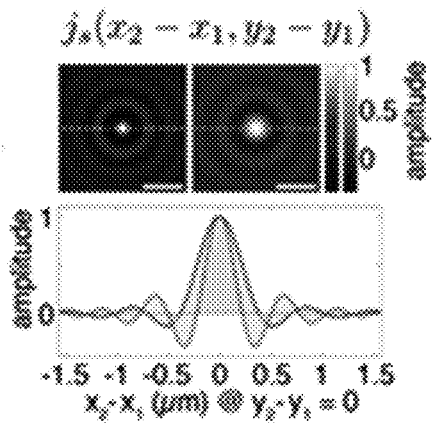
FIG. 6C shows the complex degree of mutual spatial coherence $j_s(x_2-x_1, y_2-y_1)$ for the SLED surface (left) and the bright-field illumination (right) where the bottom graph displays normalized magnitudes of $j_s(x_2-x_1, 0)$ for the SLED surface and bright-field illumination acquired along the dashed lines in the top graphs, according to some embodiments.
Figure 6D:
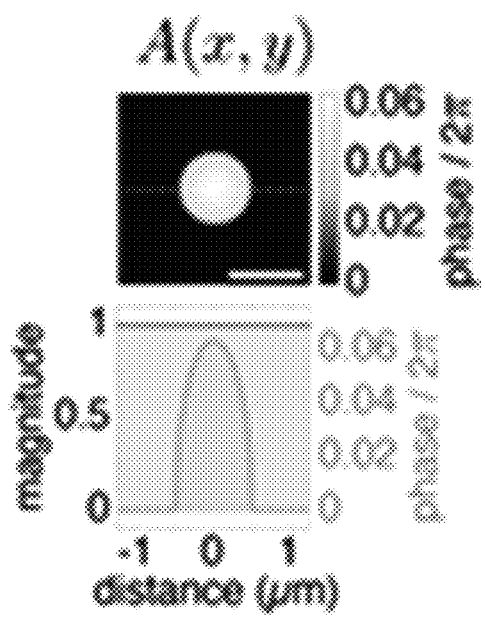
FIG. 6D shows the phase map of the complex amplitude transmission function A(x,y) of a transparent spherical particle with refractive index 1.37 for light of 630 nm wavelength where the bottom graph shows the phase profile along the dashed line in the top map and a line represents the absolute value of the object's amplitude transmission function, according to some embodiments.
Figure 6E:
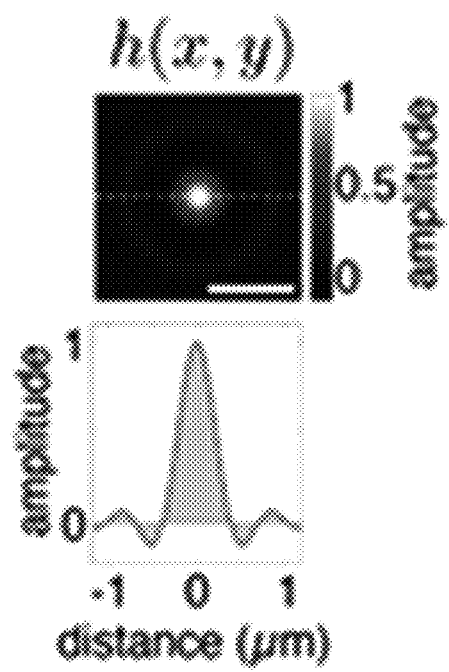
FIG. 6E shows the amplitude spread function of the imaging system as a 2D map and a profile taken along the white dashed line in the map, according to some embodiments.

The imaging characteristics of the SLED substrate in combination with a standard light microscope can be modeled in the theoretical framework of imaging with partially coherent, quasi-monochromatic light described previously in the literature. The microscope setup consisted of the SLED light source transilluminating a pure phase object, which is imaged by the objective and tube lens onto a CCD array (FIG. 6A). Focusing on the capacity to achieve image contrast, the imaging system's magnification was neglected and regard it as a simple space-invariant 4f-system, which simplifies the problem's mathematical complexity without compromising any contrast comparison. The source's coherence properties can be quantified through the mutual intensity that is incident on the object. For quasi-monochromatic illumination originating from a large uniform spatially incoherent source, such as the SLED surfaces, the source's mutual intensity spectrum $\mathcal{J}_s(u,v)$, is proportional to its angular emission profile (FIG. 5B). Here, the spatial frequencies are $$u = \frac{n}{\lambda_0}\sin\theta\cos\varphi \text{ and } v = \frac{n}{\lambda_0}\sin\theta\sin\varphi,$$

where n is the refractive index of the surrounding medium, while θ and φ are the polar and azimuthal angles marked in FIG. 2A. Furthermore, the normalized mutual intensity $j_s$ in the object plane (FIG. 6C) is proportional to the Fourier transform of $\mathcal{J}_s(u, v)$ and only depends on the space coordinate differences of any two object points $(x_1, y_1)$ and $(x_2, y_2)$, i.e. $j_s(x_1, x_2, y_1, y_2) = j_s(x_1-x_2, y_1-y_2)$. Finally, the normalized spatial intensity distribution $I(x_{im}, y_{im})$ in the image of a pure phase object with complex amplitude transmission function $A(x,y)$ (FIG. 6D) imaged through a space-invariant 4f-system with amplitude transfer function h (FIG. 6E) is given by $$I(x_{im}, y_{im}) = \iiiint\limits_{Illuminated\ area} j_s(x-x', y-y')A(x, y)$$
$$A^*(x', y')h(x_{im}-x, y_{im}-y)h^*(x_{im}-x', y_{im}-y')dxdydx'dy'$$

Figure 6F:
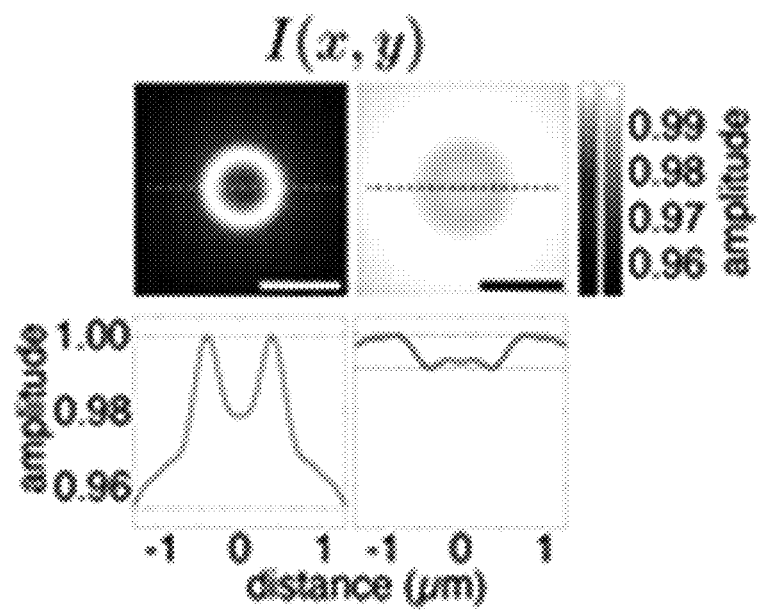
FIG. 6F a SLED image and bright-field image of the phase object with corresponding profiles shown below with scale bars in FIG. 6C-6F—1 µm, according to one set of embodiments.
Figure 6G:
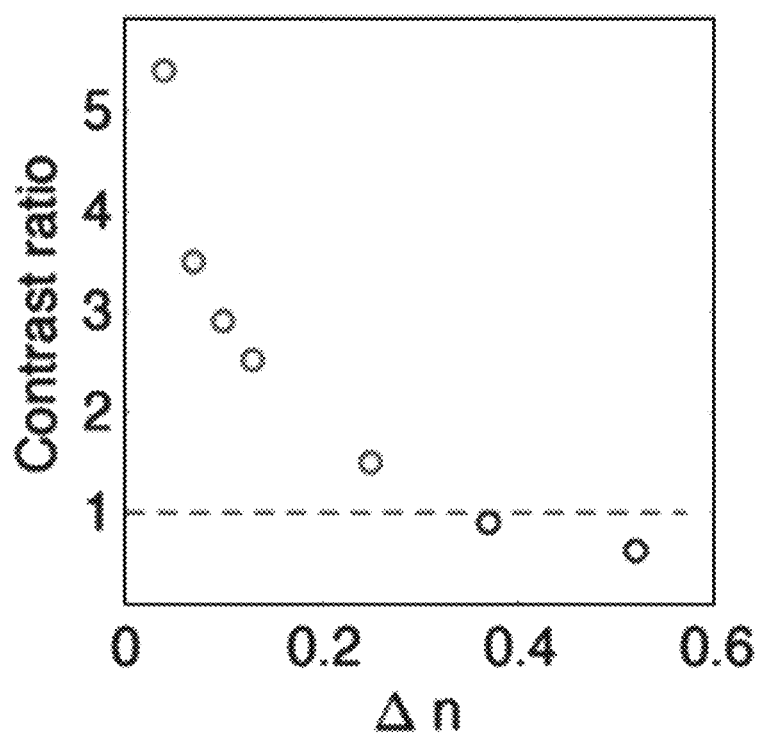
FIG. 6G shows the contrast ratio used as a metric to compare image contrast obtained with SLED light and with bright-field illumination as a function of refractive index difference Δn between phase object and surrounding medium where, for Δn≤0.3, SLED illumination provided a better contrast than bright-field light, according to some embodiments.

The four-dimensional integration in the object coordinates x, y and x', y' runs over the whole illuminated area. Images of a spherical pure phase object akin to the experimentally imaged colloids but with significantly smaller refractive index contrast (diameter—1 μm, refractive index—1.37) for SLED illumination and for bright-field light are shown in FIG. 6F. These modeling results show that the partially coherent light field emitted by the SLED surfaces enables imaging of phase objects analogous to dark-field illumination by translating phase disturbances at the object plane into intensity contrast at the image plane. Especially for transparent objects with weak refractive index difference to the surrounding medium, such as bacteria, cells, or marine micro-organisms, this technique enables enhanced contrast as compared to standard bright-field imaging (FIG. 6G). The emission characteristics of SLED surfaces are akin to the light fields achieved with a dark-field condenser in Köhler's illumination for which it can be shown that the illumination does not cause image aberrations. Consequently, only the microscope objective and tube lens contribute to aberrations. The resolution obtained with SLED illumination is comparable to the resolution in bright-field light.

In conclusion, luminescent surfaces with tailored angular emission profiles have been shown that can be generated by using processes that allow for control of the structures' composition and micro-morphology. The theoretical modeling of the surface's optical characteristics, complemented and confirmed by the experimental work, demonstrate the potential of the proposed substrate design to enable a new type of dark-field microscopy, which is termed "substrate luminescence-enabled dark-field" imaging (short SLED). This approach advantageously facilitates dark-field imaging with simple and compact light microscopes that are not equipped with dark-field components. Preliminary experiments suggest that a surface with an area of 25×25 mm can be designed to exhibit up to ten different spectrally and angularly distinct emission profiles. Such multi-spectral emitter surfaces can be used with a wide variety of light-collection equipment available on the market. Randomly rough surfaces as the bottom reflector may be a viable alternative to the concave microstructures presented here, provided their roughness is well controlled. In some embodiments, light emission from the QDs was achieved using a low-budget laser diode, however, electrical excitation of the QDs could greatly enhance this approach and could be implemented with minor design changes of the device. Combining electrical excitation with the use of a mixture of QDs, for spectral multiplexing could open new avenues toward the design of a fully integrated on-chip simultaneous dark-field and multi-spectral imaging devices.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   a dark field microscopy light source, the dark field microscopy light source comprising:
   a Bragg mirror having a light-receiving surface and a light-transmitting surface for directing light at an object;
   a reflector having a reflective surface facing the light-receiving surface of the Bragg mirror; and a light source positioned between the light-receiving surface of the Bragg mirror and the reflective surface of the reflector, wherein the dark field microscopy light source is configured so that the object, when present, and the reflector are on opposite sides of the Bragg mirror.

2. The article of claim 1, wherein the light-receiving surface is the bottom most surface of the Bragg mirror.

3. The article of claim 1, wherein the light-transmitting surface is the top most surface of the Bragg mirror.

4. The article of claim 1, wherein the light source positioned between the light-receiving surface of the Bragg mirror and the reflective surface of the reflector comprises quantum dots.

5. The article of claim 1, wherein the reflective surface has an RMS surface roughness of less than or equal to 100 microns.

6. The article claim 1, wherein the reflective surface has an RMS surface roughness of greater than or equal to 1 nanometer.

7. The article of claim 1, wherein the reflective surface has a periodic spacing of less than or equal to 50 microns.

8. The article of claim 1, wherein the reflective surface has a grating spacing of greater than or equal to 100 nanometers.

9. The article of claim 1, wherein the Bragg mirror is configured to transmit light with an annular-shaped angular distribution.

10. The article of claim 1, wherein the reflective surface comprises a patterned surface.

11. The article of claim 1, wherein the Bragg mirror comprises a plurality of layers.

12. An article, comprising:
a dark field microscopy light source, the dark field microscopy light source comprising:
a Bragg mirror having a light-receiving surface and a light-transmitting surface for directing light at an object;
a reflector having a reflective surface facing the light-receiving surface of the Bragg mirror; and
a light source positioned to emit light between the light-receiving surface of the Bragg mirror and the reflective surface of the reflector,
wherein the dark field microscopy light source is configured so that the object, when present, and the reflector are on opposite sides of the Bragg mirror.

13. The article of claim 12, wherein the light source positioned to emit light between the light-receiving surface of the Bragg mirror and the reflective surface of the reflector comprises LEDs.

* * * * *